(12) United States Patent
Wang et al.

(10) Patent No.: US 8,366,957 B2
(45) Date of Patent: Feb. 5, 2013

(54) ENVIRONMENTALLY FRIENDLY CHLORINE-FREE DEICING COMPOSITION

(75) Inventors: Dehui Wang, Changchun (CN); Dayong Wei, Changchun (CN); Yuanyuan Lin, Changchun (CN); Peng Cui, Changchun (CN)

(73) Assignee: Changchun GBT Bio-Chemical Co., Ltd., Changchun (CN)

( * ) Notice: Subject to any disclaimer, the term of this patent is extended or adjusted under 35 U.S.C. 154(b) by 0 days.

(21) Appl. No.: 13/253,469

(22) Filed: Oct. 5, 2011

(65) Prior Publication Data

US 2012/0126166 A1    May 24, 2012

(30) Foreign Application Priority Data

Nov. 23, 2010    (CN) .......................... 2010 1 0560436

(51) Int. Cl.
*C09K 3/18* (2006.01)
(52) U.S. Cl. .......................................... 252/70; 106/13
(58) Field of Classification Search .................... 106/13; 252/70
See application file for complete search history.

(56) References Cited

U.S. PATENT DOCUMENTS 6,506,318 B1 * 1/2003 Sapienza et al. ................ 252/70
2006/0261305 A1 * 11/2006 Ohike et al. ..................... 252/71
2009/0261290 A1 * 10/2009 Sapienza et al. ................ 252/70
2011/0210284 A1 * 9/2011 Simpson ......................... 252/70

FOREIGN PATENT DOCUMENTS

| JP | 60212147 A | * | 2/1994 |
| RU | 809881 A1 | * | 1/1995 |
| WO | WO01/29146 A1 | * | 4/2001 |

OTHER PUBLICATIONS

Derwent-Acc-No. 2004-569154, abstract of Russian Patent Specification No. RU2221833C1 (Jan. 2004).*
Derwent-Acc-No. 2005-662780, abstract of Russian Patent Specification No. RU2260028C1 (Oct. 2005).*

* cited by examiner

*Primary Examiner* — Anthony J Green
(74) *Attorney, Agent, or Firm* — Foley Hoag LLP

(57) ABSTRACT

The present application relates to a deicing composition, specifically to a chlorine-free deicing composition, comprising at least two active ingredients selected from glycerol, a glycol-type compound and a salt of an organic acid. The deicing compositions of the present invention contain no chlorine-containing material, are relatively less corrosive to concrete and carbon steels, and have no toxic effect on plants. Moreover, the deicing compositions of the present invention have high deicing efficiency, which is, according to the Chinese national standard GB/T23851-2009, up to 200% of the efficiency of sodium chloride or more. In addition, the deicing compositions of the present invention maintain a long-lasting deicing effect (e.g., a deicing effect for up to 3 hours).

8 Claims, 5 Drawing Sheets

ENVIRONMENTALLY FRIENDLY CHLORINE-FREE DEICING COMPOSITION

RELATED APPLICATIONS

This application claims the benefit of priority to Chinese Application Number 201010560436.8, filed on Nov. 23, 2010, the entire contents of which are incorporated herein by this reference.

TECHNICAL FIELD

The present application relates to deicing compositions, specifically to a chlorine-free deicing composition.

BACKGROUND ART

Generally, deicing agents can be classified into the following three types. The first type is chlorine-containing deicing agents composed essentially of sodium chloride and calcium chloride, with additional preservative or anti-corrosive agents. The second type is chlorine-free deicing agents composed essentially of an organic salt, such as acetic acid salts. The third type is a mixed deicing agent comprising the chlorine-containing and chlorine-free deicing agents in a particular mixing ratio.

The first and the third type of deicing agents, as described above, are highly corrosive to concrete bridges and roads, and are toxic to surrounding plants, owing to the chlorine ions contained within. As a result, the service life of concrete buildings is shortened and maintenance cost thereof is increased. In contrast, the second type of deicing agents, which contain chlorine-free organic salts, are less corrosive, but are prohibitively expensive, and may cost as much as about ten times as that of the chlorine containing deicing agents. Further, the second type of deicing agents is less effective than the chlorine-containing deicing agents, and thus is difficult to be widely used.

On the other hand, these prior-art deicing agents have short action time and need to be applied several times in order to treat thick snow cover.

SUMMARY OF THE INVENTION

For the purpose of overcoming these deficiencies of the prior-art products, the present invention provides a deicing composition with excellent deicing effects and low cost, which comprises at least two active ingredients selected from glycerol, a glycol-type compound and an organic acid salt (also referred to as "salt of organic acid").

The deicing compositions of the present invention contain no chlorine-containing material, is relatively less corrosive to concrete and carbon steels, and has no toxic effect on plants. Moreover, the deicing compositions of the present invention have high deicing efficiency, which is, according to the Chinese national standard GB/T23851-2009, up to 200% of the efficiency of sodium chloride or more. Also, the deicing compositions of the present invention have stable and long-lasting deicing effects, e.g., for up to 3 hours. In addition, the deicing compositions of the present invention are cost-effective, costing less than 50% of the cost of similar products.

EMBODIMENTS

Figure 1:
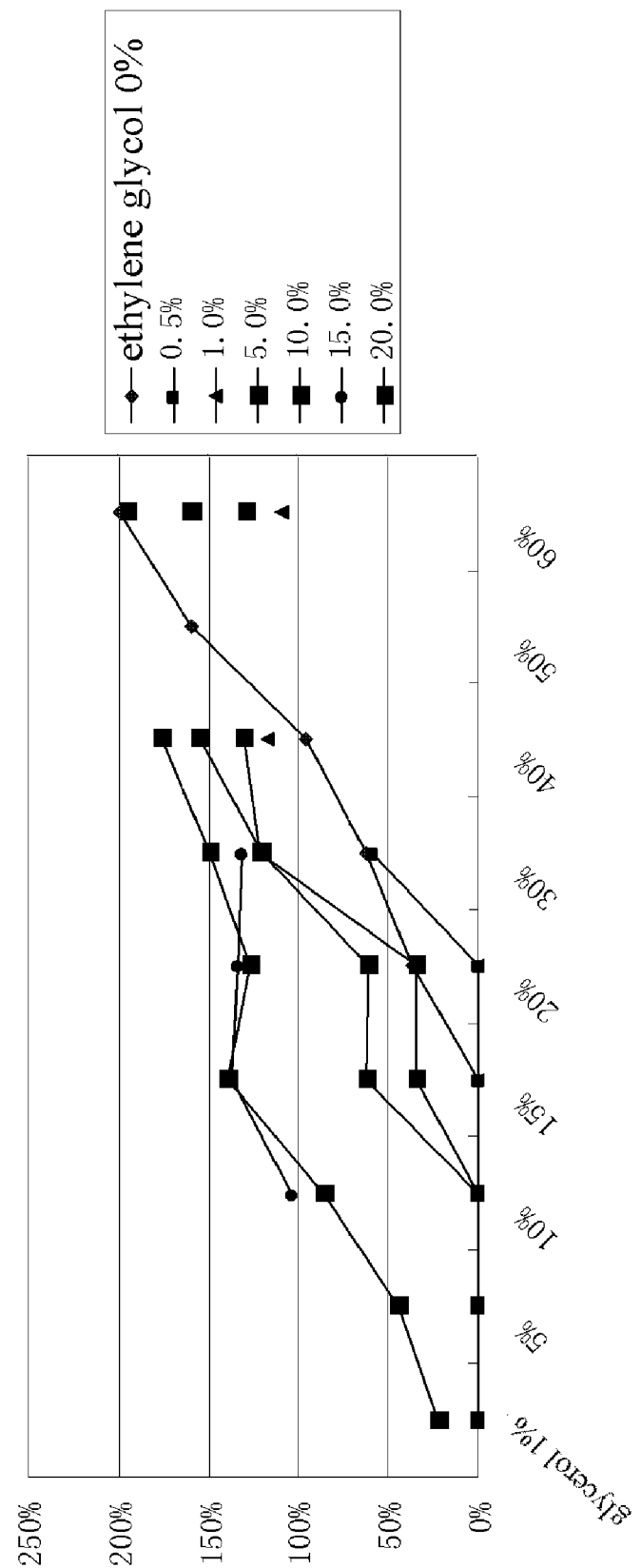
FIG. 1 is an illustrative profile of the deicing ability of the deicing compositions of the present invention which comprise glycerol and ethylene glycol in various mixing ratios.

Unless specified otherwise, the percentage or parts used herein indicates percentage by weight or parts by weight.

Unless specified otherwise, the typical, preferred, more preferred range, etc., for each item, may be combined together to form a new range.

In addition to the active ingredients, the inventive deicing composition may comprise water. The weight ratio of active ingredients to water is typically 10:1 to 1:10, preferably 5:1 to 1:8, and more preferably 2:1 to 1:5.

According to one embodiment of the invention, the deicing composition comprises at least two active ingredients selected from glycerol, a glycol-type compound and a salt of an organic acid, with the amounts thereof in each case independent of one another being 2-80 parts by weight of glycerol, 0.1-50 parts by weight of the glycol-type compound and 0.1-50 parts by weight of the salt of an organic acid.

According to one embodiment of the invention in which glycerol is used. In another embodiment, glycerol is used in a relatively larger amount as compared with other ingredients. The glycerol herein is commercially available, and is typically used in an amount of 2-80 parts by weight, preferably 5-70 parts by weight, more preferably 5-60 parts by weight, and most preferably 5-40 parts by weight.

The glycol-type compound used in the present invention is commercially available, examples of which include $C_{1-6}$ glycol, such as ethylene glycol, propylene glycol, 1,2-butylene glycol, 1,3-butylene glycol, 1,4-butylene glycol, pentylene glycol, hexylene glycol or combinations thereof. Ethylene glycol, propylene glycol or the combination thereof is preferably used. The glycol-type compound is used in an amount of 0.1-50 parts by weight, preferably 0.5-45 parts by weight, more preferably 1-40 parts by weight, and most preferably 1-30 parts by weight.

The salt of the organic acid used in the present invention is a conventional salt in the art for such purpose. For the purpose of environmental protection, however, chlorine-free salts are preferably used. Examples of salt used in the present invention include alkali metal salts or alkali earth metal salts of lower organic acids, such as sodium, calcium, potassium, or magnesium salts of lactic acid, acetic acid, formatic acid or citric acid, etc. The amount thereof is typically 0.1-50 parts by weight, preferably 1-45 parts by weight, more preferably 3-40 parts by weight, and most preferably 5-30 parts by weight.

In one embodiment of the present invention, the deicing composition comprises glycerol and a glycol-type compound as active ingredients. The amount of glycerol used is preferably 10-60 parts by weight, and the amount of the glycol-type compound is 5-30 parts by weight. Preferably, the amount of glycerol is 10-40 parts by weight, and that of the glycol-type compound is 1-10 parts by weight.

In another embodiment of the present invention, the deicing composition comprises a salt of an organic acid and a glycol-type compound as active ingredients. In this deicing composition, the amount of the organic acid salt used is 5-30 parts by weight, and the amount of the glycol-type compound is 10-30 parts by weight. Preferably, the amount of the organic acid salt is 20-30 parts by weight, and the amount of the glycol-type compound is 10-30 parts by weight.

In another embodiment of the present invention, the deicing composition comprises glycerol and an organic acid salt as active ingredients. In this composition, the amount of glycerol used is 10-60 parts by weight, and the amount of the organic acid salt is 5-30 parts by weight. Preferably, the amount of glycerol is 10-60 parts by weight, and the amount of the organic acid salt is 5-20 parts by weight.

In another embodiment of the present invention, the deicing composition comprises glycerol, a glycol-type compound and an organic acid salt as active ingredients. In this composition, typically, the amount of glycerol used is 5-30 parts by weight, the amount of the glycol-type compound is 5-20 parts by weight, and the amount of the organic acid salt is 5-20 parts by weight. Meanwhile, the inventors have found that the combination of three components in low contents can result in an unexpected deicing effect, and the resulting deicing composition is particularly cost effective. Preferably, the amount of glycerol is 5-20 parts by weight, the amount of glycol-type compound is 5-10 parts by weight, and the amount of the organic acid salt is 5-10 parts by weight.

The deicing ability of the inventive deicing composition is evaluated according to the Chinese national standard GB/T23851-2009. Specifically, the method is carried out as follows:

1) Adding 100 ml water into each one of two 150 ml porcelain crucibles, which have the same diameter and height, and placing the crucibles into thermostatic incubator with a temperature of −10±1° C. so that ice is formed;
2) adding 25 ml solution of deicing composition and 25 ml aqueous solution of sodium chloride into 50 ml beaker, respectively, and keeping them in the thermostatic incubator with a temperature of −10±1° C. for 12 hours, thus being ready for use;
3) removing the porcelain crucibles containing ice block from the thermostatic incubator, wiping out water and ice from the outer surface, and immediately weighing out the mass of crucibles, with an accuracy to 0.1 g;
4) pouring the obtained solution of deicing composition into the porcelain crucibles containing ice block and putting the crucibles back into the incubator;
5) after 0.5 hours, taking out the porcelain crucibles, decanting the liquid, immediately weighing out the mass of crucible together with the residual ice block; and
6) assessing the deicing ability for sodium chloride with the same manner.

Results:

The deicing ability is represented by $w_1$ (%), which is calculated as follows:

$$w_1 = \frac{m_0 - m_1}{m_0' - m_1'} \times 100$$

in which:
- $m_0$—the mass of crucible and ice with no deicing solution, in g;
- $m_0'$—the mass of crucible and ice with no sodium chloride solution, in g;
- $m_1$—the mass of crucible and the residual ice with deicing solution, in g; and
- $m_1'$—the mass of crucible and the residual ice with sodium chloride solution, in g.

The final result is an average value of parallel tests, and the absolute difference between two parallel measurements shall be no more than 5%.

In accordance with this standard, a deicing ability greater than 100% means that the deicing effect is better than that of sodium chloride.

The amount of deicing composition used is determined from the mass of snow or ice. The deicing composition can be applied one to three times according to weather conditions from light snow to heavy snow, and the amount or frequency can be increased when it comes to a snow storm. Preferably, the deicing composition can be applied once or more before the snow.

Specifically, by way of illustration, the following amount may be applied, and the actual amount is not limited thereto.

| The amount of ice/snow | The application rate of deicing composition [ml/(m² each time)] |
|---|---|
| light snow | 100 ± 5 |
| moderate snow | 150 ± 5 |
| heavy snow | 200 ± 5 |

The inventive deicing composition has excellent deicing abilities, which, according to GB/T23851-2009, can be determined as follows:

| parameters | | value |
|---|---|---|
| Deicing ability/(g/min) | | More than 90% of that of sodium chloride |
| Freezing point/° C. | | ≦−33 |
| pH | | 6.0-10.0 |
| Corrosion rate to carbon steel/(mm/a) | | ≦0.05 |
| Corrosion rate to concrete/(kg/m²) | | ≦0.1 |
| Decreases of friction on road surface/% | Dry base | ≦6 |
| | Wet base | ≦16 |
| mercury (Hg) w/% | | ≦0.0001 |
| cadmium (Cd) w/% | | ≦0.0005 |
| chromium (Cr) w/% | | ≦0.0015 |
| lead (Pb) w/% | | ≦0.0025 |
| arsenic (As) w/% | | ≦0.0005 |

The present invention is further illustrated by the following examples.

EXAMPLES

Example 1

The Deicing Ability of Single Components

The deicing abilities of single components were evaluated according to the Chinese national standard GB/T23851-2009, and the test results are summarized in the following Table 1, in which the amount of active ingredients is represented by its concentration in aqueous solutions:

TABLE 1

The deicing ability of single components

| Content | 5% | 10% | 15% | 20% | 30% | 40% | 50% | 60% |
|---|---|---|---|---|---|---|---|---|
| Ethylene glycol | 0% | 0% | 0% | 134% | 156% | 170% | | |
| propylene glycol | 0% | 0% | 0% | 129% | 131% | 138% | | |
| Glycerol | 0% | 0% | 0% | 38% | 62.1% | 96% | 160% | 200% |
| Sodium acetate | 0% | 0% | 55% | 80% | 146% | 224% | | |

From the above Table 1, it is evident that ethylene glycol, propylene glycol, or glycerol alone, present in a concentration of less than 15%, has no deicing ability. The sodium acetate alone has no deicing ability either when it is present in a concentration of less than 10%.

However, it should be noted that although glycerol has deicing ability at a very high concentration, it is very difficult to apply. The reason is that as the concentration of glycerol increases, the viscosity thereof increases, too, which leads to the formation of a pasty mass at a low temperature, and thus it may not be sprayed. On the other hand, as to ethylene glycol, it is true that the deicing ability thereof can be 134% when present at a concentration of 20%, which is evaluated at −10° C., but it has no deicing ability at a lower temperature (see Table 2). Nevertheless, with the addition of glycerol and salts, the deicing composition can be used at a temperature as low as −35° C. (for further evaluation, see Example 8).

TABLE 2

The deicing ability of ethylene glycol at lower temperatures

| Temp. | Ethylene glycol 20% | Ethylene glycol 30% | Ethylene glycol 40% |
|---|---|---|---|
| −10° C. | 134% | 156% | 170% |
| −15° C. | freezing | 90% | 100% |
| −25° C. | / | freezing | freezing |

Example 2

Deicing Compositions Comprising Various Contents of Glycerol and Ethylene Glycol Glycerol and ethylene glycol were mixed in various ratios. Deicing abilities of these compositions were evaluated according to the Chinese national standard GB/T23851-2009, the results of which are listed in the following Table 3. The amount of active ingredients is represented by its concentration in aqueous solutions.

TABLE 3

| | Ethylene glycol | | | | | | |
|---|---|---|---|---|---|---|---|
| glycerol | 0% | 0.5% | 1.0% | 5.0% | 10.0% | 15.0% | 20.0% |
| 1% | 0% | 0% | 0% | 0% | 0% | | 22% |
| 5% | 0% | 0% | 0% | 0% | 0% | | 45% |
| 10% | 0% | 0% | 0% | 0% | 0% | 104% | 86% |
| 15% | 0% | 0% | 0% | 35% | 62% | 137% | 139% |
| 20% | 37% | 0% | 0% | 35% | 61% | 134% | 127% |
| 30% | 62% | 59% | | 122% | 121% | 132% | 150% |
| 40% | 96% | | 117% | 131% | 155% | | 176% |
| 50% | 160% | | | | | | |
| 60% | 200% | | 109% | 129% | 160% | | 195% |

The above results are plotted in FIG. 1. From the above result, it can be seen that in the deicing compositions of ethylene glycol and glycerol, when the content of glycerol exceeds 30%, or when the content of ethylene glycol exceeds 15%, the deicing ability increases significantly.

Example 3

Deicing Composition Comprising 5% Sodium Acetate and Various Amounts of Glycerol or Ethylene Glycol Five percent sodium acetate was mixed with various amounts of glycerol or ethylene glycol. Deicing abilities of these compositions were evaluated according to the Chinese national standard GB/T23851-2009, the results of which are listed in the following Table 4. The amount of active ingredients is represented by its concentration in aqueous solutions.

TABLE 4

| Content | Ethylene glycol | glycerol |
|---|---|---|
| 5% | 0 | 0 |
| 10% | 0 | 0 |
| 15% | 31% | 0 |
| 20% | 95% | 48% |
| 30% | 122% | 73% |
| 40% | | 120% |

Figure 2:
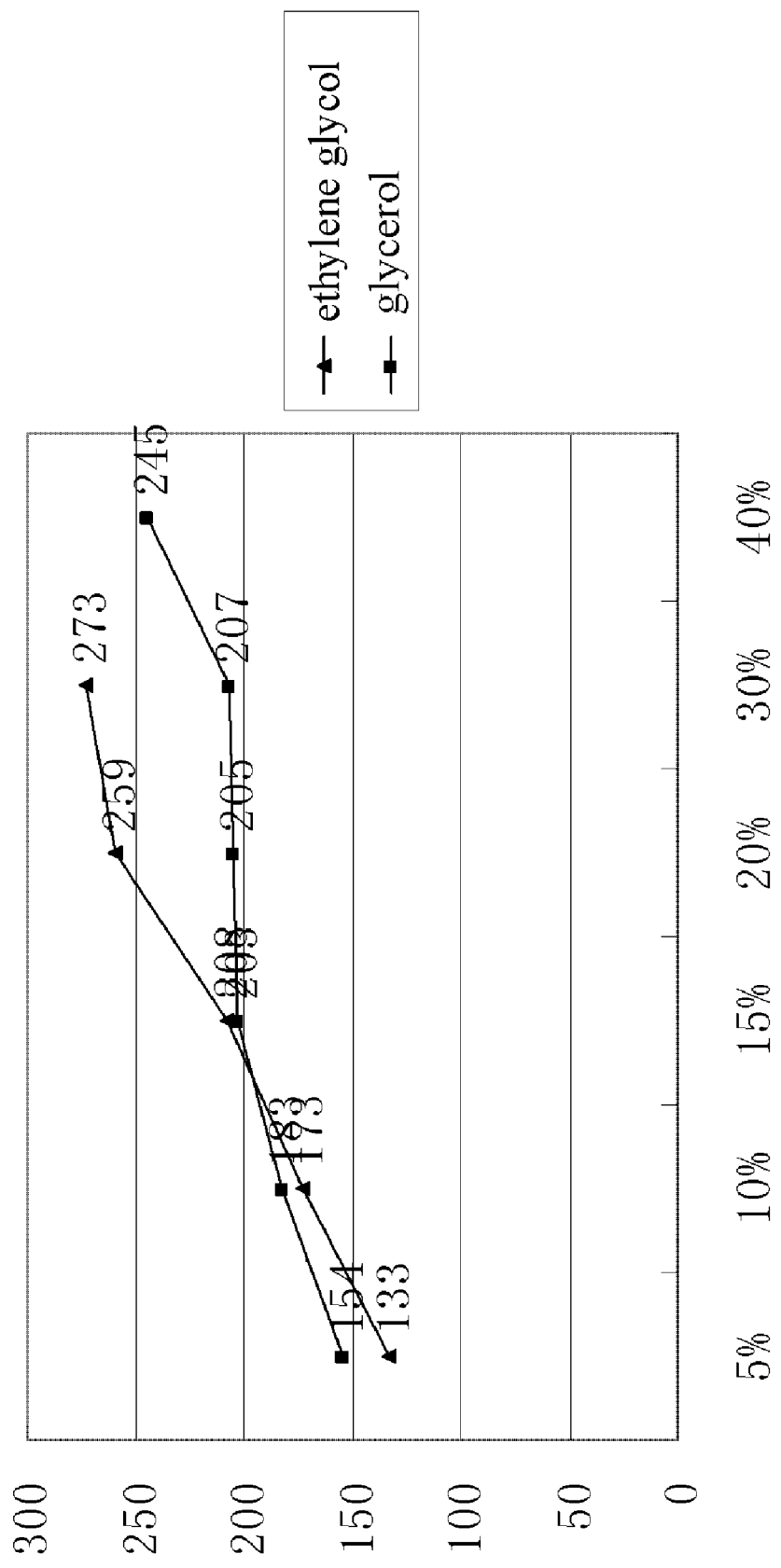
FIG. 2 is an illustrative profile of the deicing ability of the deicing compositions of the present invention which comprise 5% of sodium acetate and various proportions of ethylene glycol or glycerol.

The results are plotted in FIG. 2.

Example 4

Deicing Composition Comprising 10% Sodium Acetate and Various Amounts of Glycerol or Ethylene Glycol Ten percent sodium acetate was mixed with various amounts of glycerol or ethylene glycol. Deicing abilities of these compositions were evaluated according to the Chinese national standard GB/T23851-2009, the results of which are listed in the following Table 5. The amount of active ingredients is represented by its concentration in aqueous solutions.

TABLE 5

| Content | Ethylene glycol | glycerol |
|---|---|---|
| 5% | | |
| 10% | | 61% |
| 15% | 79% | 68% |
| 20% | 107% | 91% |
| 30% | 132% | 114% |
| 40% | | 125% |

Figure 3:
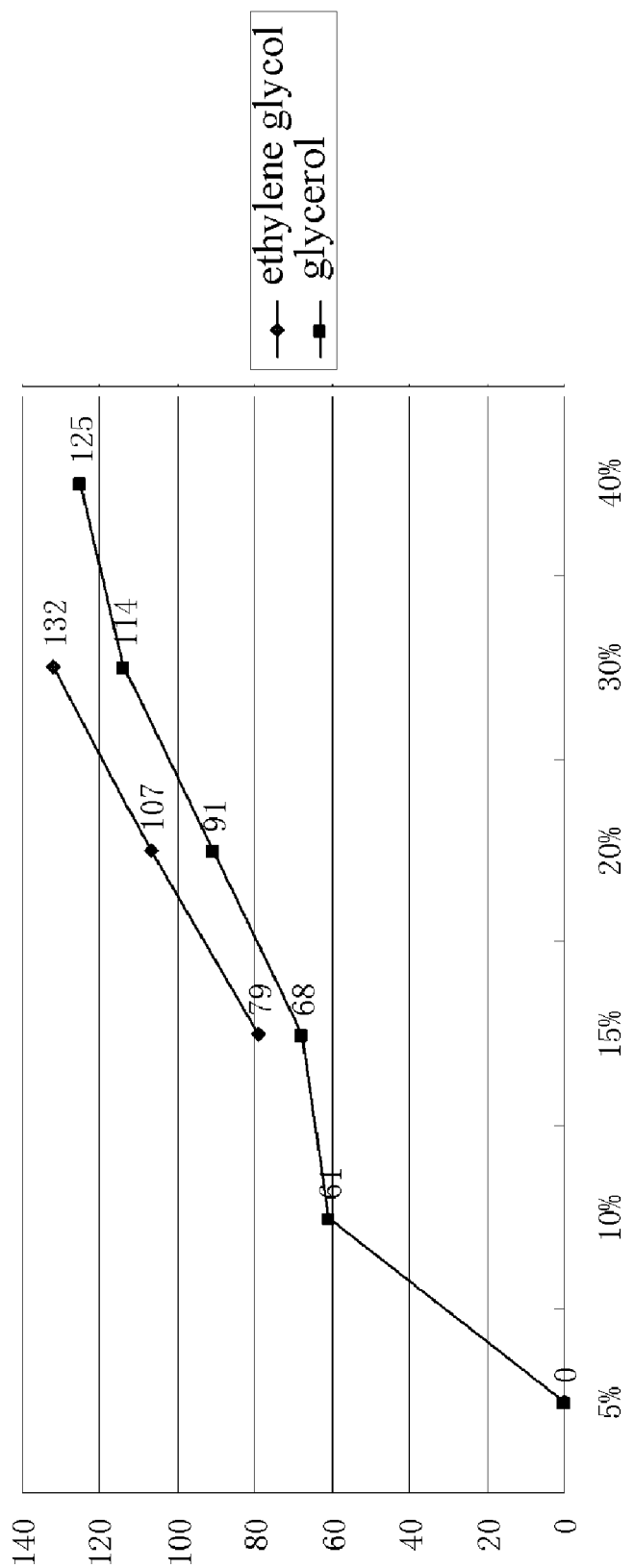
FIG. 3 is an illustrative profile of the deicing ability of the deicing compositions of the present invention which comprise 10% of sodium acetate and various proportions of ethylene glycol or glycerol.

The results are plotted in FIG. 3.

Example 5

Deicing Composition Comprising 20% Sodium Acetate and Various Amounts of Glycerol or Ethylene Glycol Twenty percent sodium acetate was mixed with various amounts of glycerol or ethylene glycol. Deicing abilities of these compositions were evaluated according to the Chinese national standard GB/T23851-2009, the results of which are listed in the following Table 6. The amount of active ingredients is represented by its concentration in aqueous solutions.

TABLE 6

| Content | Ethylene glycol | glycerol |
|---|---|---|
| 5% | 2.1% | 76% |
| 10% | 13% | 94% |
| 15% | 126% | 101% |
| 20% | 133% | 146% |
| 30% | 196% | 158% |
| 40% |  | 177% |

Figure 4:
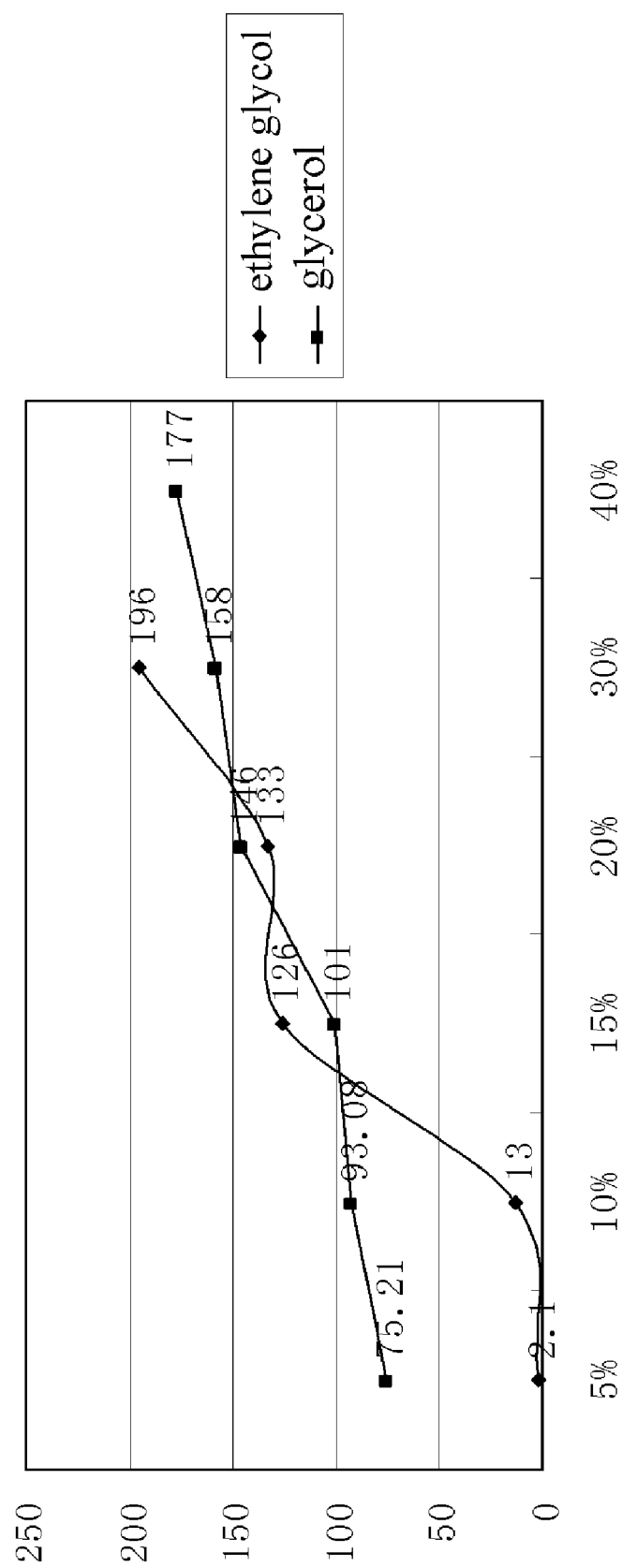
FIG. 4 is an illustrative profile of the deicing ability of the deicing compositions of the present invention which comprise 20% of sodium acetate and various proportions of ethylene glycol or glycerol.

The results are plotted in FIG. 4.

Example 6

Deicing Composition Comprising 30% Sodium Acetate and Various Amounts of Glycerol or Ethylene Glycol Thirty percent sodium acetate was mixed with various amounts of glycerol or ethylene glycol, the balance being water. Deicing abilities of these compositions were evaluated according to the Chinese national standard GB/T23851-2009, the results of which are listed in the following Table 7. The amount of active ingredients is represented by its concentration in aqueous solutions.

TABLE 7

| Content | Ethylene glycol | glycerol |
|---|---|---|
| 5% | 133% | 154% |
| 10% | 173% | 183% |
| 15% | 208% | 203% |
| 20% | 259% | 205% |
| 30% | 273% | 207% |
| 40% |  | 245% |

Figure 5:
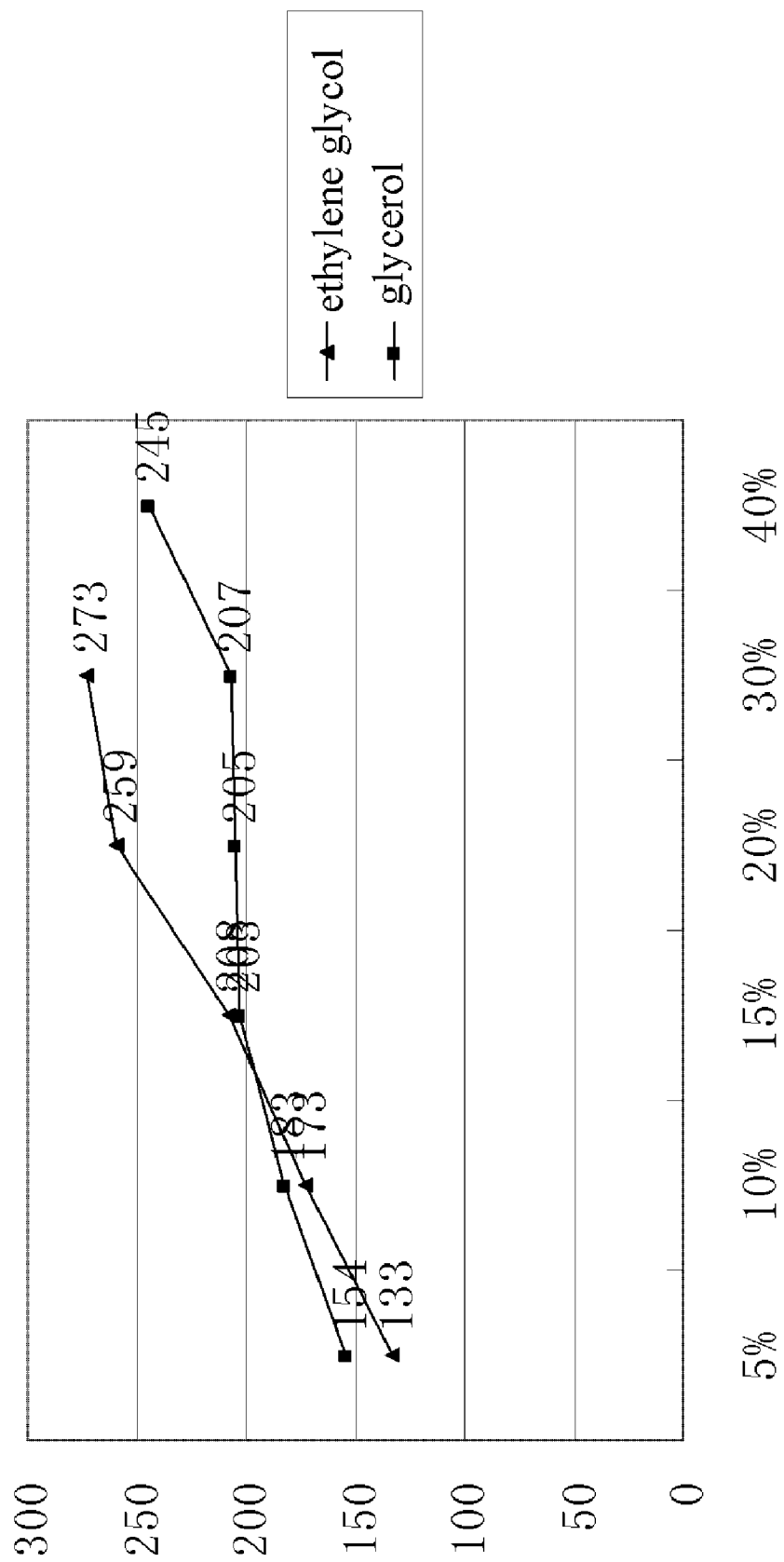
FIG. 5 is an illustrative profile of the deicing ability of the deicing compositions of the present invention which comprise 30% of sodium acetate and various proportions of ethylene glycol or glycerol.
Figure 2:
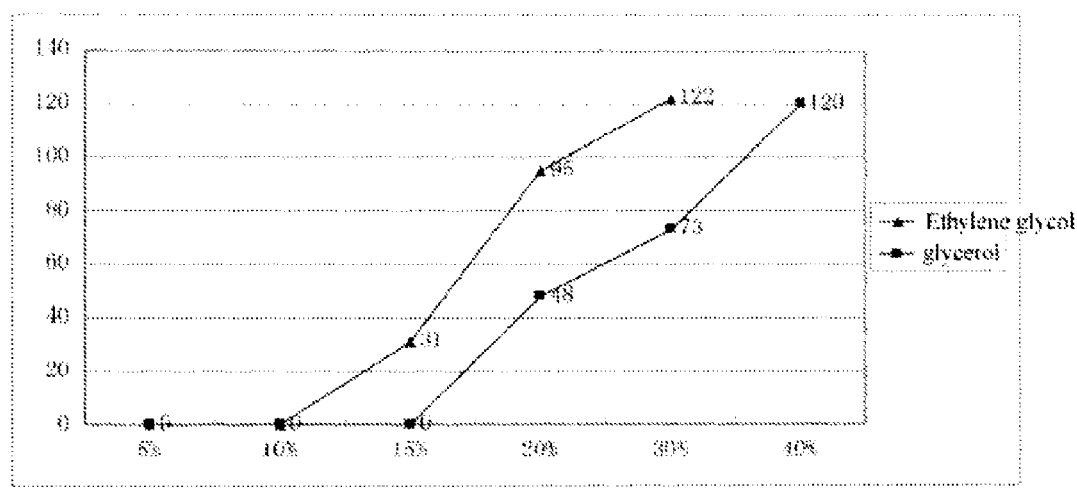

The results are plotted in FIG. 5.

Example 7

The Effect of Deicing Composition with Multiple Components

Aqueous solutions of 5% ethylene glycol, 5% propylene glycol and 5% glycerol were mixed. The deicing effect of the composition was evaluated according to the Chinese national standard GB/T23851-2009, and the result showed that the deicing ability is 0%.

Aqueous solutions of 10% ethylene glycol, 10% propylene glycol and 10% glycerol were mixed. The deicing effect of the composition was evaluated according to the Chinese national standard GB/T23851-2009, and the result showed that the deicing ability is 108%.

Aqueous solutions of 5% ethylene glycol, 5% propylene glycol, 10% glycerol and 5% sodium acetate were mixed. The deicing effect of the composition was evaluated according to the Chinese national standard GB/T23851-2009, and the result showed that the deicing ability is 108%.

From these results and further in view of the results shown in Table 1, it is evident that the combinations of substances which have no deicing ability alone showed excellent deicing effect when combined. Compared with conventional deicing agents, the deicing compositions of the present invention with multi-components are advantageous with respect to cost, while also retaining an excellent deicing effect profile and being environment friendly.

Example 8

The Deicing Ability of 20% Ethylene Glycol at a Temperature Lower than −10° C.

Twenty percent ethylene glycol was mixed with various amounts of glycerol or sodium acetate. Deicing ability was evaluated according to the Chinese national standard GB/T23851-2009, except that the temperature was −15° C., −25° C. and −35° C., respectively. The results are listed in the following Table 8, in which the amount of active ingredients is represented by its concentration in aqueous solutions.

TABLE 8

|  | −15° C. | −25° C. | −35° C. |
|---|---|---|---|
| 5% sodium acetate and 5% glycerol | 95% | freeze | freeze |
| 10% sodium acetate and 10% glycerol | 99% | 95% | 92% |
| 20% sodium acetate and 20% glycerol | 120% | 111% | 105% |
| 30% sodium acetate and 30% glycerol | 145% | 135% | 133% |
| 30% sodium acetate and 40% glycerol | 170% | 168% | 160% |
| 30% sodium acetate and 50% glycerol | 185% | 179% | 171% |
| 20% sodium acetate and 60% glycerol | 190% | 181% | 179% |

From the above table, it can be seen that the inventive composition has excellent deicing effect in a temperature as low as −35° C. As a result, the application of inventive compositions is not restricted by weather conditions.

INCORPORATION BY REFERENCE

All publications, patents, and patent applications mentioned herein are hereby incorporated by reference in their entirety as if each individual publication, patent or patent application was specifically and individually indicated to be incorporated by reference. In case of conflict, the present application, including any definitions herein, will control.

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed is:

1. A deicing composition comprising glycerol, a glycol and a salt of an organic acid, in which the amount of glycerol is 5-70 parts by weight, the amount of the glycol is 1-30 parts by weight, the amount of the salt of the organic acid is 5-30 parts by weight, and wherein the salt of the organic acid is selected from the group consisting of an alkali metal salt, an alkali earth metal salt of lower organic acid, a sodium salt of lactic acid, a calcium salt of lactic acid, a potassium salt of lactic acid, a magnesium salt of lactic acid, a sodium salt of acetic acid, a calcium salt of acetic acid, a potassium salt of acetic acid, a magnesium salt of acetic acid, a sodium salt of formic acid, a calcium salt of formic acid, a potassium salt of formic acid, a magnesium salt of formic acid, a sodium salt of citric acid, a calcium salt of citric acid, a potassium salt of citric acid, a magnesium salt of citric acid, and combinations thereof.

2. The deicing composition of claim 1, wherein the amount of glycerol is 5-60 parts by weight.

3. The deicing composition of claim 1, wherein the amount of glycerol is 5-30 parts by weight, the amount of the glycol is 5-20 parts by weight, and the amount of the salt of the organic acid is 5-20 parts by weight.

4. The deicing composition of claim 3, wherein the amount of glycerol is 5-20 parts by weight, the amount of the glycol is 5-10 parts by weight, and the amount of the salt of the organic acid is 5-10 parts by weight.

5. The deicing composition of claim 1, further comprising water, wherein the weight ratio of water to the active ingredients glycerol, glycol and the salt of an organic acid is 5:1 to 1:8.

6. The deicing composition of claim 1, wherein the glycol is selected from the group consisting of ethylene glycol, propylene glycol, and a mixture thereof.

7. The deicing composition of claim 1, wherein the content of glycerol is higher than that of any other ingredient.

8. The deicing composition of claim 5, wherein the weight ratio of water to the active ingredients glycerol, glycol and the salt of an organic acid is 2:1 to 1:5.

* * * * *

UNITED STATES PATENT AND TRADEMARK OFFICE
CERTIFICATE OF CORRECTION

PATENT NO. : 8,366,957 B2  
APPLICATION NO. : 13/253469  
DATED : February 5, 2013  
INVENTOR(S) : Dehui Wang et al.

Page 1 of 2

It is certified that error appears in the above-identified patent and that said Letters Patent is hereby corrected as shown below:

In the drawings:

At Sheet 2 of 5 of the drawings, replace:

Figure 2

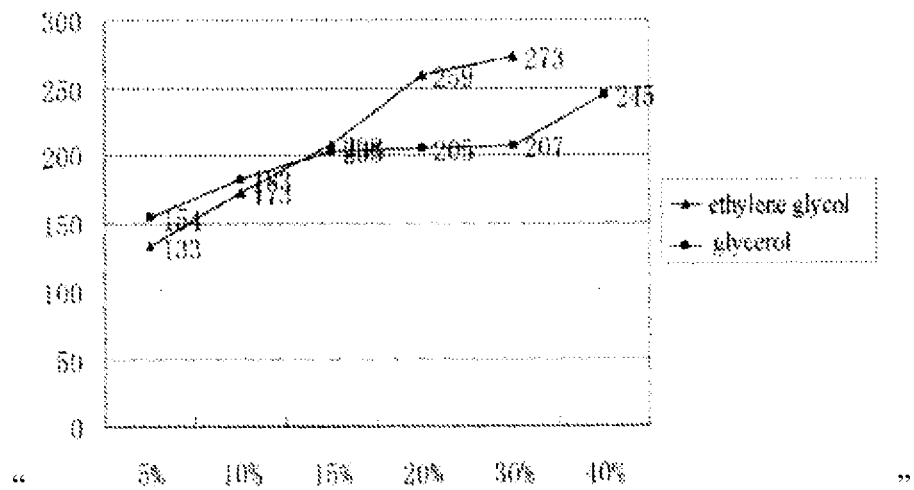

" "

Signed and Sealed this  
Sixteenth Day of July, 2013

Teresa Stanek Rea  
*Acting Director of the United States Patent and Trademark Office* with -- --